United States Patent
Kamil et al.

(10) Patent No.: US 12,416,725 B2
(45) Date of Patent: Sep. 16, 2025

(54) DEVICE AND METHOD FOR DETERMINING A POSITION OF AT LEAST ONE OBJECT

(71) Applicant: Robert Bosch GmbH, Stuttgart (DE)

(72) Inventors: Mustafa Kamil, Ludwigsburg (DE); Nico Heussner, Karlsruhe (DE); Nicole Parusel, Hessigheim (DE); Stefan Spiessberger, Weinstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1381 days.

(21) Appl. No.: 17/045,584

(22) PCT Filed: Apr. 11, 2019

(86) PCT No.: PCT/EP2019/059178
§ 371 (c)(1),
(2) Date: Oct. 6, 2020

(87) PCT Pub. No.: WO2019/201719
PCT Pub. Date: Oct. 24, 2019

(65) Prior Publication Data
US 2021/0026010 A1  Jan. 28, 2021

(30) Foreign Application Priority Data
Apr. 19, 2018 (DE) .................. 102018205984 .5

(51) Int. Cl.
*G01S 17/06* (2006.01)
*G01S 7/481* (2006.01)
*G01S 7/499* (2006.01)

(52) U.S. Cl.
CPC ............ *G01S 17/06* (2013.01); *G01S 7/4815* (2013.01); *G01S 7/4816* (2013.01); *G01S 7/499* (2013.01)

(58) Field of Classification Search
CPC ...... G01S 17/06; G01S 7/4815; G01S 7/4816; G01S 7/499; G01S 17/931; G01S 17/42; G01S 7/4814; G01S 7/487
See application file for complete search history.

(56) References Cited

U.S. PATENT DOCUMENTS 8,054,464 B2   11/2011   Mathur et al.
2017/0248796 A1  8/2017  Banks et al.

FOREIGN PATENT DOCUMENTS

CN   105022180 A   11/2015
CN   106569228 A   4/2017
(Continued)

OTHER PUBLICATIONS

Rieck, Karen: Polarization of Light in Physics Classes. An Elementarization Approach to Introducing Concepts and Principles of Quantum Physics; Dissertation for obtaining the doctoral degree in natural sciences, (2003), pp. 1-140 [English Abstract only]; https://kobra.uni-kassel.de/bitstream/handle/123456789/726/Rieck.pdf?sequence=1&isAllowed=y.

(Continued)

*Primary Examiner* — Daniel L Murphy
*Assistant Examiner* — Amie M Ndure
(74) *Attorney, Agent, or Firm* — NORTON ROSE FULBRIGHT US LLP

(57) ABSTRACT

A device for determining a position of an object is provided. The device includes at least one first emitter configured to emit a first transmission light signal that travels from the device to the object, and at least one detector that is configured to detect a reception light signal that travels from the object to the detector. The detector includes at least one pixel matrix that includes at least one pixel. The device includes at least one passive polarization adaptation unit configured to control a polarization of the reception light signal as a function of an ambient light signal. A method for (Continued)

determining a position of at least one object with the aid of such a device is also described, in which the measuring-control element measures a first signal-to-noise ratio at a first measuring point in time, and a second signal-to-noise ratio at a second measuring point in time.

21 Claims, 4 Drawing Sheets

(56) References Cited

FOREIGN PATENT DOCUMENTS

| | | | |
|---|---|---|---|
| DE | 102013207148 A1 * | 11/2013 | ............. G01S 17/89 |
| DE | 102013219344 A1 | 3/2015 | |
| DE | 102016011340 A1 | 3/2017 | |
| DE | 102016201599 A1 | 8/2017 | |
| WO | 2014198623 A1 | 12/2014 | |

OTHER PUBLICATIONS

International Search Report for PCT/EP2019/059178, Issued Jul. 24, 2019.

* cited by examiner

DEVICE AND METHOD FOR DETERMINING A POSITION OF AT LEAST ONE OBJECT

FIELD

The present invention relates to a device for determining a position of at least one object, the device including at least one first emitter that is configured to emit a first transmission light signal that travels from the device to the object, and the device including at least one detector that is configured to detect a reception light signal that travels from the object to the detector, the detector including at least one pixel matrix that includes at least one pixel.

Moreover, the present invention relates to a method for determining a position of at least one object with the aid of such a device.

BACKGROUND INFORMATION

This type of device is also referred to as a LIDAR device (originally a portmanteau of "light" and "radar"). A LIDAR device may be used, among other things, to determine a position of an object relative to itself and to other objects. Possible applications result in the automotive sector, for example. The functional principle of a LIDAR device is conventional.

In the automotive field, LIDAR devices that operate with a laser source as emitter are usually used. The laser source (an edge emitter, for example), depending on the system, generally emits linearly polarized light as a transmission light signal. However, this is not a system requirement of the LIDAR system, but, rather, a "parasitic" phenomenon based on the emitter used.

The linear polarization of the transmission light signal has now an effect on the system performance of the device (LIDAR). The transmission light signal determines the signal-to-noise ratio (SNR) in relation to the ambient brightness, i.e., an ambient light signal. The ambient brightness, i.e., the ambient light signal, represents an "interference light or ambient light" that is a function of the operational environment of the device (LIDAR) as well as the time of day. The predominant polarization of the ambient light signal changes as a function of the time of day.

The signal-to-noise ratio (SNR) is crucial for the achievable range of the device (LIDAR). Thus, the signal-to-noise ratio will change as a function of the prevailing ambient light signal, and thus the time of day.

The change in the predominant polarization of the ambient light with the time of day takes place due to the scattering of sunlight at the air molecules in the atmosphere. When the sun is near the zenith, a predominantly parallel polarization of the ambient light signal is observed. When the sun is near the horizon, a predominantly perpendicular polarization of the ambient light signal is observed.

The system performance of the device thus varies as a function of the time of day.

A polarization switching LIDAR device is described in U.S. Pat. No. 8,054,464 B2, in particular for detecting and characterizing particulates distributed in the air, including an actively controlled phase retarder that includes two states, with different phase retardations, for changing the polarization of light. According to one specific embodiment, an active control of the polarization direction in the transmission path as well as an additional active global polarization control in the reception path may be present.

A detector for optically detecting at least one single object is described in PCT Application No. WO 2014/198623 A1. The use of a Bayer filter having different absorption properties on the pixel level of the detector is provided.

SUMMARY

According to an example embodiment of the present invention, a device is provided that includes at least one passive polarization adaptation unit that is configured to control a polarization of the reception light signal as a function of an ambient light signal.

The example device according to the present invention may have the advantage that on the one hand, a significant improvement in a signal-to-noise ratio may thus be achieved by efficiently eliminating the ambient light signal. On the other hand, a stable system performance of the device (as well as the predominant polarizations of the ambient light signal that change over the day) may be achieved over the course of the day. This means a greater range of the device and more stable availability of the range. The position of objects more remote from the device may be determined more reliably with the aid of the device. In the present specific embodiment, a passive control of the polarization with the aid of the passive polarization adaptation unit is used, which is inserted into a reception path. The polarization of the reception light signal that is reflected from the object is controlled as a function of the ambient light signal.

It is advantageously possible for the passive polarization adaptation unit to include a polarization filter matrix that includes at least one static polarization filter and is situated between the detector and the object.

In this configuration, the reception light signal reflected from the object initially passes through the polarization filter matrix before it strikes the detector. During a passage of the reception light signal through the polarization filter of the polarization filter matrix, only the desired portion of the polarization is allowed to pass through, and the remaining portion is blocked. It is thus possible to control a polarization of the reception light signal.

It is also advantageous that a position of the static polarization filter is coordinated with a position of the pixel.

In this specific embodiment, the static polarization filter is used on the pixel level in the reception path of the device. The polarization filter matrix is thus a passive polarization filter array with static polarization filtering, i.e., static passage levels and filter levels. A 1:1 association of a polarization filter of the polarization filter matrix with a pixel of the pixel matrix of the detector may be provided. The filtering action is achievable, for example, by using small metal filaments.

In accordance with an example embodiment of the present invention, it is also advantageous that the polarization filter matrix has an alternating arrangement made up of a polarization filter for perpendicular polarization or for parallel polarization, and a passage space.

In this specific embodiment, the polarization filter matrix has a design similar to a "Bayer filter" conventional in image processing, in which a 1:1 association of a polarization filter with a pixel is present. The alternating arrangement of a polarization filter and a passage space creates a "checkerboard pattern," in which a polarization filter for perpendicular polarization or a polarization filter for parallel polarization alternates with an unfiltered pixel. The position of the polarization filter is coordinated with the position of the passage space. For a passage direction of the polarization filter, for example for perpendicular polarization, a perpendicularly polarized transmission light signal (und thus a reception light signal) may now be used. This may be achieved, for example, by using a vertically emitting edge emitter as a first emitter. Alternatively, this may be achieved with some other appropriate type of laser in the transmission path, i.e., for the transmission light signal. The incoming ambient light signal is then optimally blocked with the aid of polarization filters, at least over one-half of the day (in the present case, with the sun at the zenith, and a predominantly parallel-polarized ambient light signal). In combination with the unfiltered pixels, for a signal-to-noise ratio of 50% this results in a 25% improvement in the signal-to-noise ratio on a daily average.

Moreover, according to an example embodiment of the present invention, a device is provided that includes an active polarization adaptation unit that is configured to control a polarization of the first transmission light signal as a function of the ambient light signal.

This may have the further advantage that, on the one hand, a significant improvement in a signal-to-noise ratio may thus be achieved by efficiently eliminating the ambient light signal. On the other hand, system performance of the device, as well as the predominant polarizations of the ambient light signal that change over the day, which are stable over the course of the day may be achieved. This means a greater range of the device. The position of objects more remote from the device may be determined more reliably with the aid of the device. In the present specific embodiment, an additional active control of the polarization with the aid of the active polarization adaptation unit is used, which is inserted into a transmission path. The polarization of the first transmission light signal that is emitted by the first emitter is controlled as a function of the ambient light signal.

In accordance with an example embodiment of the present invention, it is advantageous that the active polarization adaptation unit includes a second emitter that is configured to emit a second transmission light signal that travels from the device to the object, and the second transmission light signal being polarized orthogonally with respect to the first transmission light signal.

The first emitter and the second emitter may be designed as lasers that are polarized orthogonally with respect to one another. For example, it is possible to use two edge emitters that are rotated orthogonally with respect to one another. Thus, via the first emitter and the second emitter, a first transmission light signal and a second transmission light signal of the device are available. This first transmission light signal and the second transmission light signal are polarized orthogonally with respect to one another, so that a suitable transmission light signal may be selected for an ambient light signal that is predominantly parallel-polarized as well as predominantly perpendicularly polarized.

It is preferred that the active polarization adaptation unit includes a measuring-control element that is configured to measure a signal-to-noise ratio of the device and to control the first emitter and/or the second emitter as a function of the signal-to-noise ratio.

"Adaptive switching" may thus take place between the first emitter and the second emitter. This adaptive switching may take place as a function of the time of day. Thus, a measurement of the signal-to-noise ratio may take place continuously with the aid of the measuring-control element during operation of the device. In the event of a degradation of the measured signal-to-noise ratio, the device may then activate the particular emitter, which is inactive at this point in time, at the right time so that the emitter emits a transmission light signal. At the same time, the other active emitter may be correspondingly deactivated at this point in time with the aid of the measuring-control element. In other words, for example the first emitter will initially emit the first transmission light signal with a polarization that is perpendicular to the ambient light signal. The predominant polarization of the ambient light signal will now slowly change over the course of the day during operation of the device. The polarization will change into a polarization that is predominantly perpendicular with respect to the initial state of the ambient light signal at the beginning of operation of the device. At the same time as this "rotation" of the polarization of the ambient light signal, the measured signal-to-noise ratio will become more degraded. The measuring-control element may deactivate the first emitter as soon as such degradation occurs. The emission of the first transmission light signal thus ends. At the same time, the measuring-control element activates the second emitter. The emission of the second transmission light signal, which is polarized orthogonally with respect to the first transmission light signal, thus begins. The second transmission light signal is now better coordinated with the changed polarization of the ambient light signal, and the signal-to-noise ratio is improved. The transmission light signal is thus polarized orthogonally with respect to the predominant polarization of the ambient light signal at any time of day. In combination with the passive polarization adaption element, for a signal-to-noise ratio of 50% this results in a 50% improvement in the signal-to-noise ratio at any time of day. The orthogonal polarizations of the first transmission light signal and of the second transmission light signal may be achieved by using more laser (for example, emitting with a rotation by 30°), or alternatively by active polarization rotating elements in the transmission path (liquid crystal, Pockels cell, or rotatable waveplate, for example).

According to an example embodiment of the present invention, a device is provided in which the active polarization adaptation unit includes at least one controllable polarization rotating element, and the polarization filter matrix is situated between the detector and the controllable polarization rotating element.

In accordance with an example embodiment of the present invention, it is particularly advantageous when the polarization filter matrix includes only uniform polarization filters (i.e., for example only parallel-transmitting polarization filters instead of the alternating arrangement of polarization filters for perpendicular polarization and polarization filters for parallel polarization). The polarization filter matrix may thus be designed as a uniform polarization filter. The controllable polarization rotating element is then connected upstream from a uniform polarization filter in the reception path, and may be formed from an electrically controllable liquid crystal, a Pockels cell, or a rotatable waveplate, for example.

Due to the use of the active polarization adaptation unit, the incoming reception light signal into the device is oriented predominantly perpendicularly with respect to the ambient light signal. By adaptive rotation of the polarization of the incoming reception light signal, control may now be carried out in such a way that the reception light signal is always optimally situated in the transmission plane of the uniform, static polarization filter, while the incoming ambient light signal is optimally situated in the absorption plane of the polarization filter.

Using reception light signals which at any time of day are oriented orthogonally with respect to the polarization of the ambient light signal, in combination with a static, uniformly transmitting polarization filter, results in a doubling of the number of pixels, and thus of the image resolution, due to the lack of a need for alternating the transmission plane. In addition, according to this specific embodiment it is not necessary to use polarization filter matrices: it is sufficient to use standard polarization filters for the entire detector surface. In addition, the adaptive change of the polarization rotation may take place "slowly," depending on the time of day. Cost-effective liquid crystals having switching times in the ms range may be used, since the change in the position of the sun over a period of an hour takes place significantly more slowly.

For a signal-to-noise ratio of 50%, this results in a 100% improvement in the signal-to-noise ratio at any time of day. The ambient light signal is always optimally blocked in front of the detector.

Moreover, according to an example embodiment of the present invention, a method is provided in which the measuring-control element measures a first signal-to-noise ratio at a first measuring point in time, the measuring-control element measures a second signal-to-noise ratio at a second measuring point in time, and the measuring-control element controls the second emitter to emit the second transmission light signal if the second signal-to-noise ratio is less than the first signal-to-noise ratio.

As a result, as explained in detail above, the polarization of the incoming reception light signal is always predominantly orthogonal with respect to the incoming ambient light signal. As soon as the polarization of the ambient light signal, relative to the polarization of the first transmission light signal, for example, rotates out of the optimal perpendicular position of the two polarizations with respect to one another, the signal-to-noise ratio is degraded. At this point in time the measuring-control element deactivates the active emitter, and at the same time activates the inactive emitter. The inactive emitter emits a transmission light signal perpendicularly with respect to the transmission light signal of the now inactive emitter. As a result, the angular relationship between the polarizations of the transmission light signal, and thus of the reception light signal, and the ambient light signal is once again optimized; i.e., a preferably orthogonal relationship between same is established.

In this method it is preferred that the measuring-control element controls the second emitter to emit the second transmission light signal at periodic time intervals, and the measuring-control element determines a third signal-to-noise ratio at the point in time that the second transmission light signal is emitted. The measurement of the signal-to-noise ratio may thus take place periodically, and may be periodically checked for possible improvement, using the third signal-to-noise ratio of the second emitter. For this purpose, the second emitter carries out a test emission at certain time intervals.

BRIEF DESCRIPTION OF THE DRAWINGS

Exemplary embodiments of the present invention are explained in greater detail with reference to the figures and the description below.

DETAILED DESCRIPTION OF EXAMPLE EMBODIMENT

Figure 1:
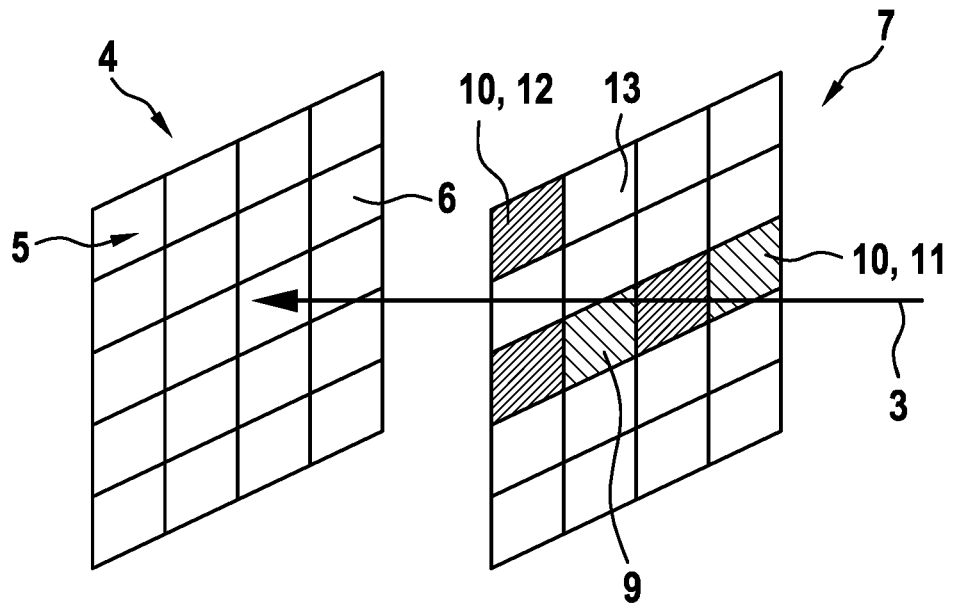
FIG. 1 shows a device for determining a position of at least one object, including a passive polarization adaptation unit in accordance with an example embodiment of the present invention.

The device according to an example embodiment of the present invention includes a first emitter 1 that is configured to emit a first transmission light signal 2. This transmission light signal 2 is reflected at an object whose position is to be determined, and as a reception light signal 3 travels back to the device. Here it strikes a detector 4 that includes a pixel matrix 5 including at least one pixel 6.

FIG. 1 shows a device in accordance with an example embodiment of the present invention that includes a passive polarization adaptation unit 7 that is configured to control a polarization of the reception light signal 3 as a function of an ambient light signal 8. Passive polarization adaptation unit 7 includes a polarization filter matrix 9. This polarization filter matrix 9 includes a plurality of static polarization filters 10. In the exemplary embodiment shown, polarization filters for perpendicular polarization 11 and polarization filters for parallel polarization 12 alternate in a checkerboard-like pattern. A passage space 13 is provided in each case between a polarization filter for perpendicular polarization 11 and a polarization filter for parallel polarization 12.

Individual polarization filters 10 are situated in a 1:1 association with pixels 6 of pixel matrix 5. This is similar to a Bayer filter conventional in image processing. Polarization filters 10 may be formed with the aid of small metal filaments, for example.

A perpendicularly polarized reception light signal 3 may be used in a passage direction for perpendicular polarization. This may be achieved, for example, with the aid of a vertical edge emitter as first emitter 1 or some other appropriate type of laser in the transmission path. In this case, ambient light signal 8 is then optimally blocked at pixels 6 via polarization filter 10, at least over one-half of the day (in the present case, with the sun at the zenith, and a parallel-polarized ambient light signal 8).

In combination with unfiltered pixels 6 behind passage space 13, for a signal-to-noise ratio of 50% this results in a 25% improvement in the signal-to-noise ratio on a daily average.

Figure 2:
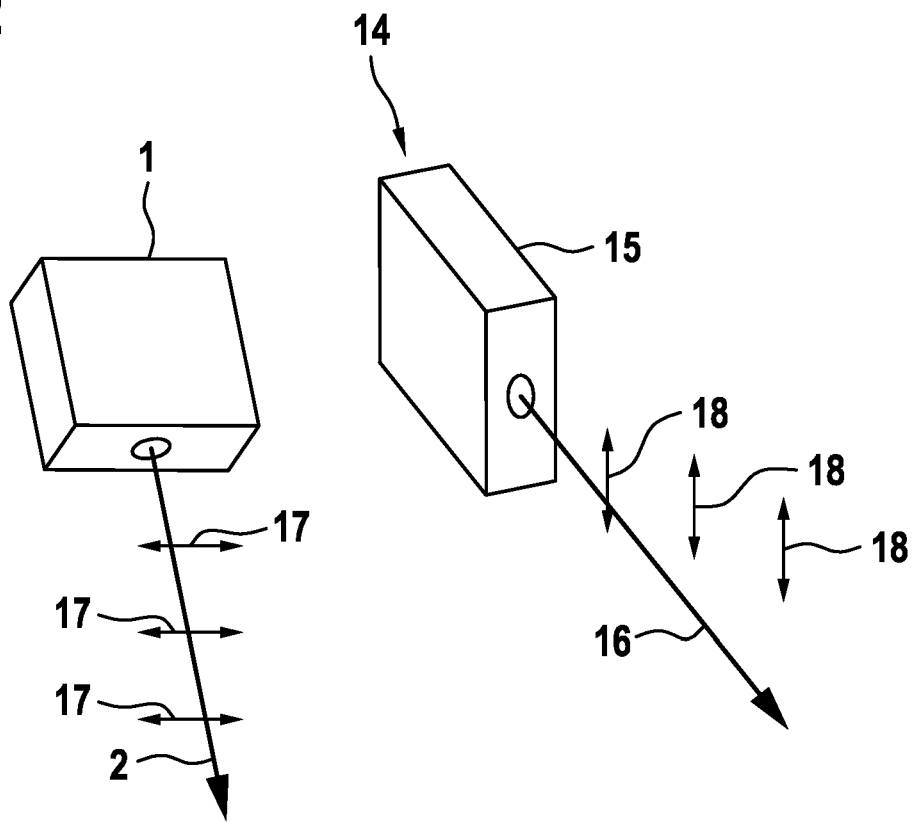
FIG. 2 shows a device for determining a position of at least one object, including an active polarization adaptation unit, in accordance with an example embodiment of the present invention.

FIG. 2 shows a device in accordance with an example embodiment of the present invention that includes an active polarization adaptation unit 14. In the exemplary embodiment shown, this active polarization adaptation unit 14 includes a second emitter 15. Second emitter 15 is configured to emit a second transmission light signal 16. In the exemplary embodiment shown, first emitter 1 emits a first transmission light signal 2 with a parallel polarization 17. Second emitter 15 emits a second transmission light signal 16 with a perpendicular polarization 18. The polarization of first transmission light signal 2 is thus set orthogonally with respect to the polarization of second transmission light signal 16. These polarizations may be achieved via more laser (as first emitter 1 and second emitter 15), for example emitting with a rotation by 30°, or alternatively by active polarization rotating elements (not illustrated) in the transmission path (a liquid crystal, a Pockels cell, or a rotatable waveplate, for example).

Figure 4:
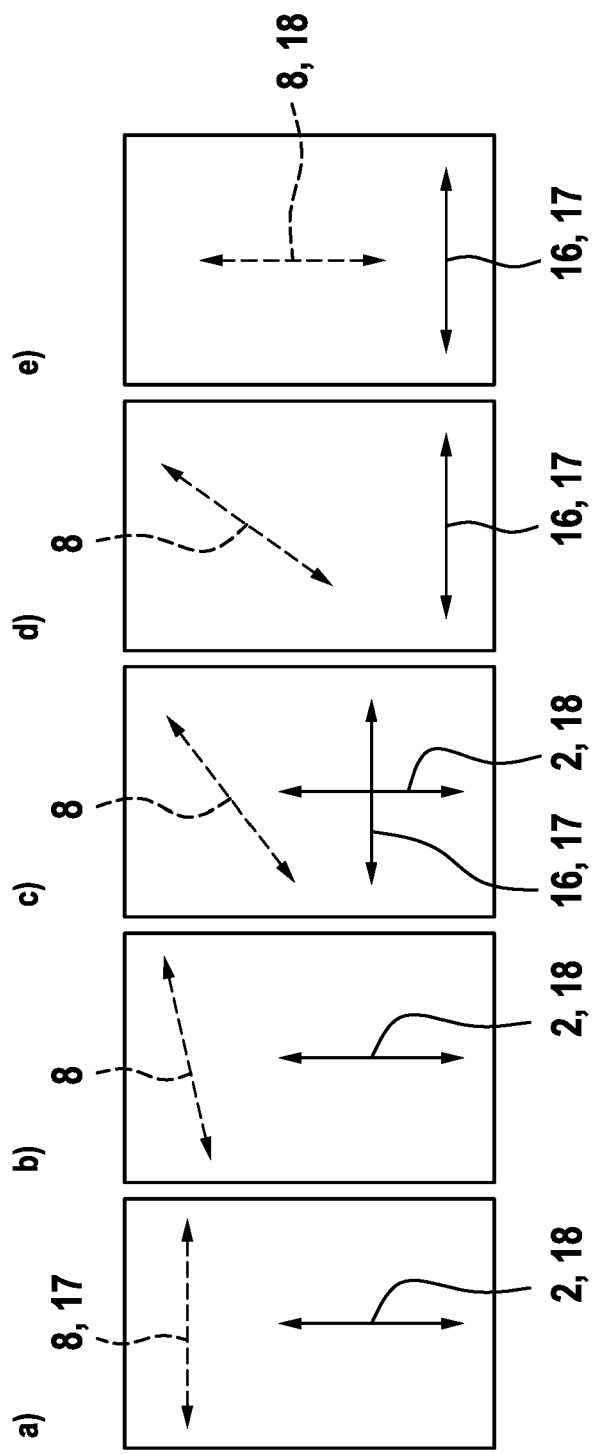
FIG. 4 shows a method for determining a position of an object with the aid of a device that includes an active polarization adaptation unit, in accordance with an example embodiment of the present invention.

FIG. 4 shows the operating principle of the device in accordance with an example embodiment of the present invention including active polarization filter unit 14. In the figure, panel a) shows first transmission light signal 2 in perpendicular polarization 18 by way of example. In contrast, ambient light signal 8 has parallel polarization 17. The orientation of predominantly parallel polarization 17 of ambient light signal 8 is thus optimally set with regard to perpendicular polarization 18 of first transmission light signal 2.

During the course of operation of the device and the advancing time of day, the predominant polarization of ambient light signal 8 will now change over time, from parallel polarization 17 (panel a) into perpendicular polarization 18 (panel e). The optimally orthogonal orientation of the polarization of ambient light signal 8 with respect to first transmission light signal 2 will likewise degrade due to this change, and the signal-to-noise ratio will increase. The signal-to-noise ratio may be determined with the aid of a measuring-control element (not illustrated). As soon as the signal-to-noise ratio is thus degraded, the measuring-control element may control second emitter 15, which then emits second transmission light signal 16. Second transmission light signal 16 has a parallel polarization 17. The angular relationship between the polarization of ambient light signal 8 and polarization 18 that is changing to perpendicular is thus once again improved. The polarization of second transmission light signal 16 is orthogonal with respect to the polarization of first transmission light signal 2.

Concurrently with the activation of second emitter 15, first emitter 1 may be deactivated with the aid of the measuring-control element. The polarization of transmission light signal 2, 16 is thus orthogonal with respect to the predominant polarization of ambient light signal 8 at any time of day. An adaptive switching between first emitter 1 and second emitter 15 is carried out as a function of the polarization of ambient light signal 8.

The adaptive switching takes place when the measuring-control element measures a degradation of the signal-to-noise ratio. It is optionally possible here to periodically check the measurement of the signal-to-noise ratio against the signal-to-noise ratio of second emitter 15 for a possible improvement, in that second emitter 15 carries out a test emission at certain time intervals.

By combining transmission light signal 2, 16, which is set orthogonally with respect to the predominant polarization of ambient light signal 8 at any time of day, with static, alternating perpendicularly and parallel-transmitting pixels 6 (as described above), for a signal-to-noise ratio of 50% this results in a 50% improvement in the signal-to-noise ratio at any time of day.

Figure 3:
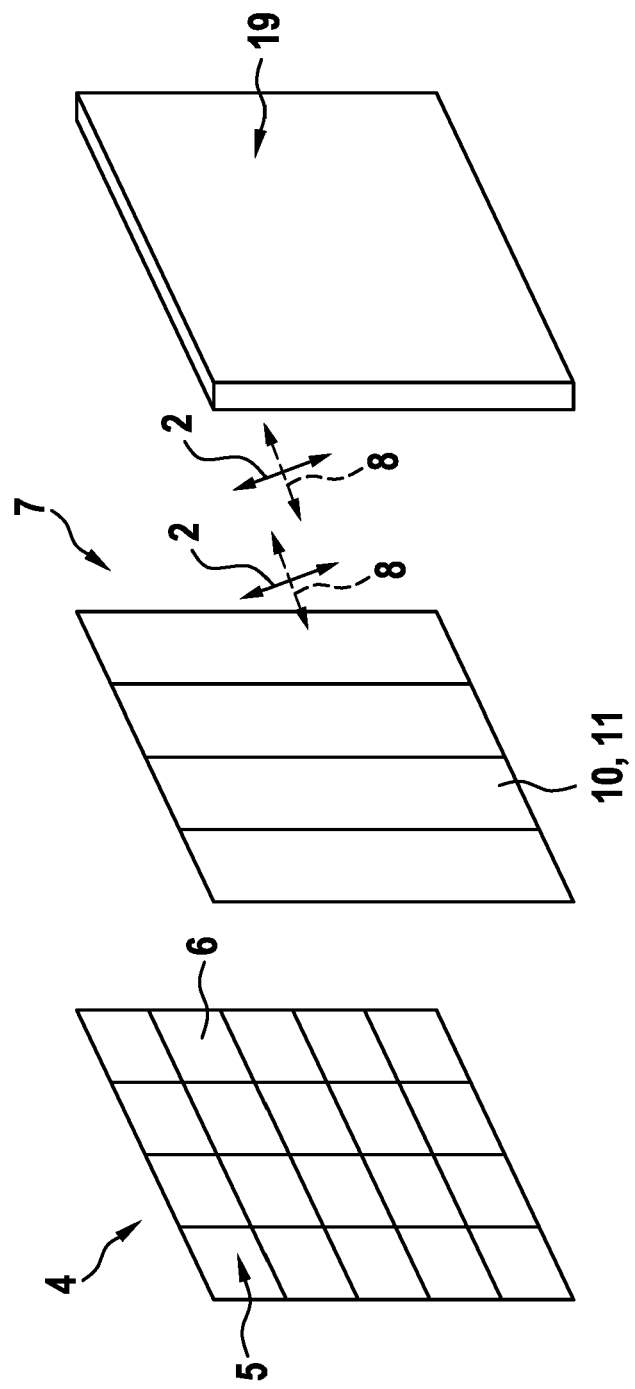
FIG. 3 shows a device for determining a position of at least one object, including a passive polarization adaptation unit and an active polarization adaptation unit, in accordance with an example embodiment of the present invention.

FIG. 3 shows a device in accordance with an example embodiment of the present invention that includes an active polarization adaptation unit 14 (not illustrated here; see FIG. 2) that includes a controllable polarization rotating element 19.

Passive polarization adaptation unit 7 is designed here as a static, uniform polarization filter (in the present case, transmitting only in parallel) for perpendicular polarization 11. Controllable polarization rotating element 19 is connected upstream therefrom in the reception path. Controllable polarization rotating element 19 may be designed as a liquid crystal, a Pockels cell, or a rotatable waveplate, for example.

Figure 5:
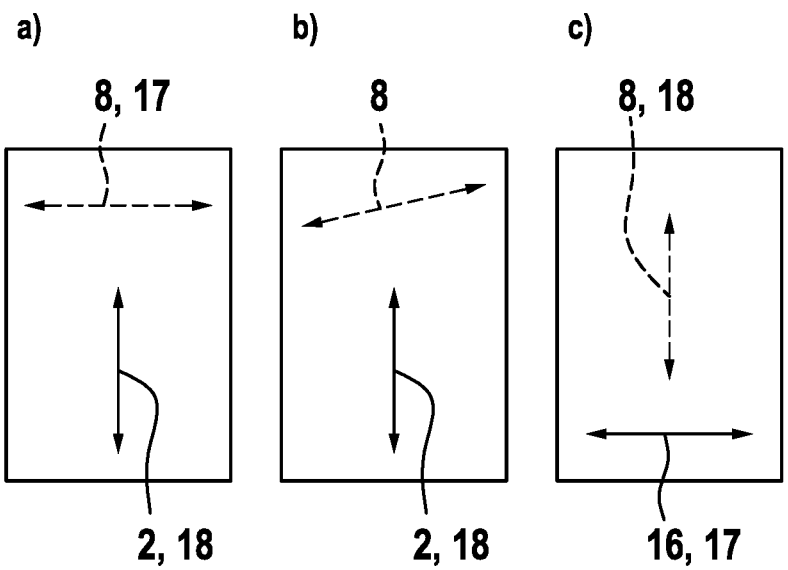
FIG. 5 shows a method for determining a position of an object with the aid of a device that includes a passive polarization unit and an active polarization unit, in accordance with an example embodiment of the present invention.
Figure 6:
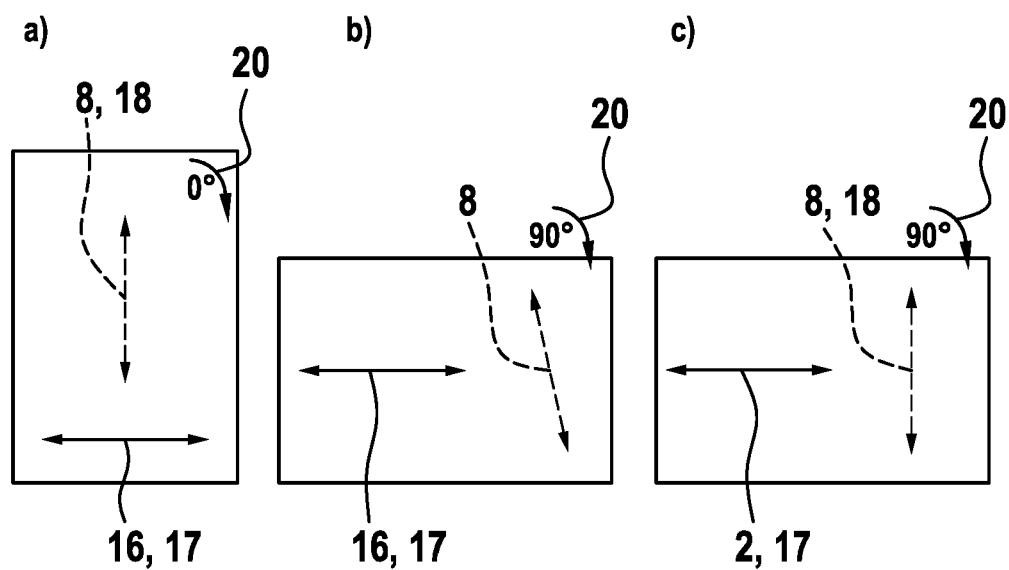
FIG. 6 shows the method according to FIG. 5, the polarization being adaptively rotated by a polarization rotation angle, in accordance with an example embodiment of the present invention.

FIGS. 5 and 6 illustrate the method for using controllable polarization rotation element 19 in accordance with an example embodiment of the present invention.

FIG. 5 shows the method prior to active rotation of the polarization in the reception path with the aid of controllable polarization rotation element 19. Here as well, as described above with reference to FIG. 4, the polarization of transmission light signal 2, 16 orthogonally with respect to the polarization of ambient light signal 8 is maintained. In panel a) of FIG. 5, first transmission light signal 2 has perpendicular polarization 18 by way of example. Ambient light signal 8 has parallel polarization 17. By rotating the polarization of ambient light signal 8, a switch is adaptively made from first transmission light signal 2 of first emitter 1 to second transmission light signal 16 of second emitter 15.

For this purpose, as illustrated in FIG. 6, it is now additionally possible to adaptively rotate the polarization by a polarization rotation angle 20. As a result, reception light signal 3 is always optimally oriented with respect to the transmission plane of uniform, static polarization filter 10. At the same time, the polarization of ambient light 8 is likewise optimally oriented with respect to the absorption plane of uniform, static polarization filter 10.

Thus, on the one hand transmission light signals 2, 16 are used that are orthogonal with respect to the predominant polarization of ambient light signal 8 at any time of day. This is achieved with the aid of controllable polarization rotation element 19. The checkerboard-like structure of polarization filter matrix 9, made up of polarization filters for perpendicular polarization 11 or polarization filters for parallel polarization 12 and passage space 13, may thus be dispensed with. This results in a doubling of the number of pixels, and the image resolution is doubled. In addition, "slow" rotations of the polarization may be used, depending on the time of day. The use of cost-effective liquid crystals as controllable polarization rotation elements 19 is possible. The "switching times" of such liquid crystals may be in the ms range, since the change in the position of the sun, and thus the change in the polarization of ambient light signal 8, over a period of an hour once again takes place significantly more slowly.

For a signal-to-noise ratio of 50%, a 100% improvement in the signal-to-noise ratio results at any time of day. Ambient light signal 8 is optimally blocked at any time of day.

What is claimed is:

1. A device for determining a position of at least one object, the device comprising:
   an optical transceiver, wherein the device is configured to use the optical transceiver to emit transmission light signals that travel from the optical transceiver to the object;
   at least one detector configured to detect reception light signals that travel from the object to the detector via the optical transceiver, the detector including at least one pixel matrix that includes at least one pixel; and
   a controller, wherein the controller is configured to:
      continuously monitor a property of the reception light signals; and dynamically change a polarization of at least one of the reception light signals and the transmission light signals as a function of changes to the property determined by the continuous monitoring;

wherein at least one of:
(I) the optical transceiver includes an electro-optic polarization modulator and the dynamic change is performed by modifying an electric field applied to the electro-optic polarization modulator;
(II) the optical transceiver includes a rotatable waveplate and the dynamic change is performed by a rotation control of the rotatable waveplate; and
(III) the optical transceiver includes a first emitter and a second emitter that have respective structures by which light emissions from the first emitter and the second emitter have mutually orthogonal polarizations and the dynamic change is performed by dynamically selecting through which of the first and second emitters the transmission light signals are emitted.

2. The device as recited in claim 1, further comprising a passive polarization adaptation unit that includes a polarization filter matrix that includes at least one static polarization filter and is situated between the detector and the object.

3. The device as recited in claim 2, wherein a position of the static polarization filter is coordinated with positions of pixels of the detector.

4. The device as recited in claim 2, wherein the polarization filter matrix has an alternating arrangement of polarization filters that apply a perpendicular polarization, polarization filters that apply a parallel polarization, and a passage space through which light passes without polarization, and the alternating arrangement is in a two-dimensional grid that corresponds to and is aligned with positions of pixels of the detector.

5. The device as recited in claim 1, wherein the optical transceiver includes a first emitter and a second emitter that have respective structures by which light emissions from the first emitter and the second emitter have mutually orthogonal polarizations and the dynamic change is performed by the dynamic selection of through which of the first and second emitters the transmission light signals are emitted.

6. The device as recited in claim 5, wherein the property is a signal-to-noise ratio of the reception light signals.

7. The device as recited in claim 1, wherein the optical transceiver includes an electro-optic polarization modulator and the dynamic change is performed by modifying an electric field applied to the electro-optic polarization modulator.

8. The device as recited in claim 7, wherein the electro-optic polarization modulator is a liquid crystal device that modulate the polarization according to an electric signal.

9. The device as recited in claim 8, wherein the electro-optic polarization modulator is formed of Pockels cells that modulate the polarization according to application of the electric field across the Pockels cells.

10. The device as recited in claim 1, wherein the optical transceiver includes the rotatable waveplate and the dynamic change is performed by the rotation control of the rotatable waveplate.

11. The device as recited in claim 10, further comprising:
a polarization filter matrix is situated between the detector and the rotatable waveplate.

12. The device as recited in claim 1, wherein the property is a signal-to-noise ratio of the reception light signals.

13. The device as recited in claim 12, wherein the controller is configured to dynamically change the polarization of the transmission light signals emitted from the device to the at least one object based on the monitored signal-to-noise ratio of the reception light signals.

14. The device as recited in claim 1, wherein the property is a change to a signal-to-noise ratio of the reception light signals over time.

15. The device as recited in claim 14, wherein the controller is configured to dynamically change the polarization of the transmission light signals emitted from the device to the at least one object based on the monitored change to the signal-to-noise ratio of the reception light signals.

16. The device as recited in claim 14, wherein the controller is configured to measure the signal-to-noise ratio at a first measuring point in time, measure the signal-to-noise ratio at a second measuring point in time following the first point in time, and change the polarization in response a determination that the signal-to-noise ratio measured at the second point in time is less than the signal-to-noise ratio measured at the first point in time.

17. A method for operating a device determining a position of at least object, the device comprising an optical transceiver using which transmission light signals are emittable to travel from the optical transceiver to the object, at least one detector configured to detect reception light signals that travel from the object to the detector via the optical transceiver, the detector including at least one pixel matrix that includes at least one pixel, and a controller, the method comprising:
continuously monitoring, by the controller, a property of the reception light signals; and
dynamically changing, by the controller, a polarization of at least one of the reception light signals and the transmission light signals as a function of changes to the property determined by the continuous monitoring;
wherein at least one of:
(I) the optical transceiver includes an electro-optic polarization modulator and the dynamic changing is performed by modifying an electric field applied to the electro-optic polarization modulator;
(II) the optical transceiver includes a rotatable waveplate and the dynamic changing is performed by a rotation control of the rotatable waveplate; and
(III) the optical transceiver includes a first emitter and a second emitter that have respective structures by which light emissions from the first emitter and the second emitter have mutually orthogonal polarizations and the dynamic changing is performed by dynamically selecting through which of the first and second emitters the transmission light signals are emitted.

18. The method as recited in claim 17, wherein the property is a signal-to-noise ratio of the reception light signals.

19. The method as recited in claim 18, wherein the dynamic change is of the polarization of the transmission light signals based on the monitored signal-to-noise ratio of the reception light signals.

20. The method as recited in claim 19, wherein the continuous monitoring includes measuring the signal-to-noise ratio at a first measuring point in time, measuring the signal-to-noise ratio at a second measuring point in time following the first point in time, and changing the polarization in response a determination that the signal-to-noise ratio measured at the second point in time is less than the signal-to-noise ratio measured at the first point in time.

21. The method as recited in claim 20, wherein:
a further transmission light signal is transmitted with the changed polarization implemented in response to the determination the signal-to-noise ratio measured at the second point in time is less than the signal-to-noise ratio measured at the first point in time;
the continuous monitoring includes measuring the signal-to-noise ratio of the reception light signals at a third point in time that follows the second point in time and at which the further transmission light signal is transmitted; and
the dynamic changing of the polarization includes another change to the polarization in response to the signal-to-noise ratio measured at the third point in time being less than the signal-to-noise ratio measured at the second point in time.

* * * * *